United States Patent
Wu et al.

(10) Patent No.: US 8,179,589 B2
(45) Date of Patent: *May 15, 2012

(54) METHODS AND COMPOSITIONS FOR IMPROVED ELECTROPHORETIC DISPLAY PERFORMANCE

(75) Inventors: Zarng-Arh George Wu, San Jose, CA (US); Jeanne E. Haubrich, Waterford, NY (US); Xiaojia Wang, Fremont, CA (US); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 12/857,428

(22) Filed: Aug. 16, 2010

(65) Prior Publication Data

US 2010/0301280 A1    Dec. 2, 2010

Related U.S. Application Data

(60) Continuation of application No. 11/686,256, filed on Mar. 14, 2007, now Pat. No. 7,800,813, which is a division of application No. 10/785,644, filed on Feb. 23, 2004, now Pat. No. 7,347,957, which is a continuation-in-part of application No. 10/618,257, filed on Jul. 10, 2003, now abandoned.

(60) Provisional application No. 60/396,680, filed on Jul. 17, 2002.

(51) Int. Cl.
*G02B 26/00* (2006.01)
*H01B 1/20* (2006.01)

(52) U.S. Cl. ......... 359/296; 359/291; 345/84; 252/500; 252/511

(58) Field of Classification Search .................. 252/500; 359/290, 291; 345/107, 84
See application file for complete search history.

(56) References Cited

U.S. PATENT DOCUMENTS

| 3,612,758 A | 10/1971 | Evans et al. |
| 4,466,701 A | 8/1984 | Ogato et al. |
| 5,908,585 A | 6/1999 | Shibuta |
| 5,930,026 A | 7/1999 | Jacobson et al. |
| 5,961,804 A | 10/1999 | Jacobson et al. |
| 6,180,224 B1 | 1/2001 | Shouji et al. |
| 6,211,274 B1 | 4/2001 | Tanegashima et al. |
| 6,271,823 B1 | 8/2001 | Grodon, II et al. |
| 6,323,989 B1 | 11/2001 | Jacobson et al. |

(Continued)

FOREIGN PATENT DOCUMENTS

EP    0 615 164 A    9/1994

(Continued)

OTHER PUBLICATIONS

Allen, K. (Oct. 2003). Electrophoretics Fulfilled. *Emerging Displays Review: Emerging Display Technologies*, Monthly Report—Oct. 2003, 9-14.

(Continued)

*Primary Examiner* — Marc Kopec
*Assistant Examiner* — Haidung Nguyen
(74) *Attorney, Agent, or Firm* — Perkins Coie, LLP.

(57) ABSTRACT

The invention is directed to novel methods and compositions useful for improving the performance of electrophoretic displays. The methods comprise adding a high absorbance dye or pigment, or conductive particles, or a conductive filler in the form of nanoparticles and having a volume resistivity of less than about $10^4$ ohm cm, or a charge transport material into an electrode protecting layer of the display.

17 Claims, 1 Drawing Sheet

U.S. PATENT DOCUMENTS

| | | |
|---|---|---|
| 6,525,865 B2 | 2/2003 | Katase |
| 6,657,772 B2 | 12/2003 | Loxley |
| 6,672,921 B1 | 1/2004 | Liang et al. |
| 6,795,138 B2 | 9/2004 | Liang et al. |
| 6,831,769 B2 | 12/2004 | Holman et al. |
| 6,930,818 B1 | 8/2005 | Liang et al. |
| 6,933,098 B2 | 8/2005 | Chan-Park et al. |
| 7,504,050 B2 | 3/2009 | Weng et al. |
| 7,800,813 B2 | 9/2010 | Wu et al. |
| 2002/0145792 A1 | 10/2002 | Jacobson et al. |
| 2003/0137717 A1 | 7/2003 | Albert et al. |
| 2005/0007653 A1 | 1/2005 | Honeyman et al. |

FOREIGN PATENT DOCUMENTS

| | | |
|---|---|---|
| EP | 0 980 067 A | 2/2000 |
| JP | 05-035152 | 2/1993 |
| JP | 2002-040967 | 2/2002 |
| JP | 2002-297079 | 10/2002 |
| JP | 2003-318196 | 11/2003 |
| WO | WO 01/67170 | 9/2001 |
| WO | WO 02/01281 | 1/2002 |
| WO | WO 02/065215 | 8/2002 |

OTHER PUBLICATIONS

Bardsley, J.N. & Pinnel, M.R. (Nov. 2004) Microcup™ Electrophoretic Displays. *USDC Flexible Display Rep ort*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Applications and the Dynamics of Companies. *TRI*. 1-10. (In Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

F. Nuesch, et al, Importance of Indium Tin Oxide Surface Acido Basicity for Charge Injection into Organic Materials Based Light Emitting Diodes. *J. Appl. Phys.*, 87, 7973, 2000.

Glatkowski, (2003) Carbon Nanotube Based Transparent Conductive Coatings. *Int'l SAMPE Symposium & Exhibition, Advanced Materials in the Global Economy—Applications, Emerging Markets and Evolving Technologies, Book 2*, pp. 2146-2152.

H. Scher and EW Montroll, Anomalous Transit-time Dispersion in Amorphous Solids. *Phys. Rev.*, B12, 2455, 1975.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA.

Ho, C., & Liang, R.C. (Dec. 2003). *Microcup (R) Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, p. 4-3. (Int'l Conference on Consumer Electronics, Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Lee, H., & Liang, R.C. (Jun. 2003) SiPix Microcup(R) Electronic Paper—An Introduction. *Advanced Display*, Issue 37, 4-9 (in Chinese, English abstract attached).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., & Tseng, S. (Feb. 2003). *Microcup(R) LCD, An New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

M.A. Hopper and V. Novotny, An Electrophoretic Display, Its Properties, Model, and Addressing. *IEEE Trans. Electr. Dev.* 26/8: pp. 1148-1152, 1979.

Nikkei Microdevices. (Dec. 2002) Newly-Developed Color Electronic Paper Promises—Unbeatable Production Efficiency. *Nikkei Microdevices*, 3. (in Japanese, with English translation).

P.M. Borsenberger and D.S. Weiss, "Photoreceptors: Organic Photoconductors" in "Handbook of Imaging Materials" edited by A.S. Diamond, pp. 379, 1991, Marcel Dekker, Inc. (Unable to obtain year 1991 version; attached is year 2002 version.).

S.A. Van Slyke, et al, Organic Electroluminescent Devices with Improved Stability. *Appl, Phys. Lett.*, 69, 2160, 1996.

Sprague, R.A. (Sep. 23, 2009) SiPix Microcup Electrophoretic Epaper for Ebooks. *NIP 25*, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al, (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, HM., (Sep. 2006) *Monochrome and Area Color Microcup®EPDs by Roll-to-Roll Manufacturing Process*. Presentation conducted at the Forth Organic Electronics Conference and Exhibition (OEC-06), Sep. 25-27, 2006, Frankfurt, Germany.

Zang, H.M., & Liang, R.C. (2003) Microcup Electronic Paper by Roll-to-Roll Manufacturing Processes. *The Spectrum*, 16(2), 16-21.

Zang, H.M., Hou, J., (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, HM., (Feb. 2007) *Developments in Microcup® Flexible Displays*. Presentation conducted at the 6th Annual Flexible Display and Microelectronics Conference, Phoenix, AZ Feb. 6-8.

Zang, HM., Wang, F., Kang, Y.M., Chen, Y., and Lin, W. (Jul. 2007) *Microcup® e-Paper for Embedded and Flexible Designs*. IDMC'07, Taipei International Convention Center, Taiwan.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

METHODS AND COMPOSITIONS FOR IMPROVED ELECTROPHORETIC DISPLAY PERFORMANCE

This application is a continuation application of U.S. application Ser. No. 11/686,256, filed Mar. 14, 2007 now U.S. Pat. No. 7,800,813; which is a divisional application of U.S. application Ser. No. 10/785,644, filed Feb. 23, 2004, now U.S. Pat. No. 7,347,957; which is a continuation-in-part of U.S. application Ser. No. 10/618,257, filed Jul. 10, 2003, abandoned; which claims the benefit of U.S. Provisional Application No. 60/396,680, filed Jul. 17, 2002; the contents of all the above applications are incorporated herein by reference in their entirety.

BACKGROUND OF THE INVENTION

1. Field of the Invention

The invention is directed to novel methods and compositions useful for improving the performance of electrophoretic displays.

2. Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

There are several different types of EPDs. In the partition type EPD (see M. A. Hopper and V. Novotny, *IEEE Trans. Electr. Dev.*, 26(8):1148-1152 (1979)), there are partitions between the two electrodes for dividing the space into smaller cells in order to prevent undesired movement of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric fluid and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S. Ser. No. 09/518,488, filed on Mar. 3, 2000 (corresponding to WO 01/67170), U.S. Ser. No. 09/606,654, filed on Jun. 28, 2000 (corresponding to WO 02/01281) and U.S. Ser. No. 09/784,972, filed on Feb. 15, 2001 (corresponding to WO02/65215), all of which are incorporated herein by reference. The improved EPD cells are prepared by microembossing a layer of thermoplastic or thermoset resin composition coated on a first substrate layer to form the microcups of well-defined shape, size and aspect ratio. The microcups are then filled with an electrophoretic fluid and sealed with a sealing layer. A second substrate layer is laminated over the filled and sealed microcups, preferably with an adhesive layer.

To reduce irreversible electrodeposition of dispersion particles or other charged species onto the electrodes (such as ITO), a thin protection or release layer may be coated on the electrodes. The protective layer improves the performance of the display, including an increase in display image uniformity and longevity. In addition, a faster electro-optical response has been observed in displays with a protective layer.

However, the thin protective layer method also has disadvantages. For example, the use of a protection or release layer on electrodes tends to result in deterioration in contrast ratio and bi-stability of the EPD. A higher Dmin (or a lower degree of whiteness or % reflectance) in the background particularly at low driving voltages is also typically observed in EPDs with coated electrodes.

Accordingly, there is a need for more effective methods to improve the response rate and image uniformity and also to reduce irreversible electrodeposition of dispersion particles or other charged species onto the electrodes.

SUMMARY OF THE INVENTION

The present invention relates to novel methods and compositions for improving the performance of an electrophoretic display.

The first aspect of the present invention is directed to a method for improving the performance of an electrophoretic display, which method comprises adding a high absorbance dye or pigment to at least one electrode protecting layer in the display. The term "high absorbance" is defined as an extinction coefficient greater than $10^3$ cm$^{-1}$M$^{-1}$, preferably in the range of about $10^3$ to about $5 \times 10^5$ cm$^{-1}$M$^{-1}$ and more preferably in the range of about $5 \times 10^3$ to about $5 \times 10^4$ cm$^{-1}$M$^{-1}$.

The second aspect of the present invention is directed to a method for improving the performance of an electrophoretic display, which method comprises adding conductive particles to at least one electrode protecting layer in the display.

The third aspect of the invention is directed to a method for improving the performance of an electrophoretic display which method comprises adding a conductive filler in the form of nanoparticles and having a volume resistivity of less than about $10^4$ ohm cm, preferably about $10^2$ to about $10^3$ ohm cm, into a composition for the formation of at least one electrode protecting layer in the display.

The conductive filler is in the form of nanoparticles. The term "nanoparticles", in the context of the present invention, refers to particles having an average primary particle size which is smaller than the range of UV-visible scattering light (about 0.15 to about 0.3 um) or a typical short-range surface roughness (about 0.05 to about 0.1 um) of a plastic film. More specifically, the average size of the primary conductive filler particles suitable for the present invention is in the range of about 5 to about 150 nanometer, preferably about 10 to about 50 nanometer and more preferably about 15 to about 20 nanometer. The term "primary particles", in the context of the present invention, refers to the particles that can be recognized individually by, for example, electronic or optical microscope. The primary particle size, in the context of the present invention, refers to the size of the primary particles before flocculation or coagulation.

The fourth aspect of the present invention is directed to a method for improving the performance of an electrophoretic display, which method comprises adding a charge transport material to at least one electrode protecting layer in the display.

The fifth aspect of the present invention is directed to an adhesive composition comprising an adhesive layer forming material and one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material.

The sixth aspect of the present invention is directed to a sealing composition comprising a sealing layer forming material and one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material.

The seventh aspect of the present invention is directed to a primer layer composition comprising a primer layer forming material and one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material.

When a conductive filler in the form of nanoparticles and having a volume resistivity of less than about $10^4$ ohm cm, preferably about $10^2$ to about $10^3$ ohm cm, is added to the adhesive, sealing or primer layer composition, an adhesive, sealing or primer layer having an intended volume resistivity of about $10^7$ to $10^{10}$ ohm cm may be achieved.

The adhesive, sealing and primer layer compositions of the present invention are particularly useful for electrophoretic displays prepared by the microcup technology.

The eighth aspect of the present invention is directed to a method for improving the performance of an electrophoretic display by incorporating non-light-absorbing conducting particles into a composition for the formation of an electrode protecting layer.

The ninth aspect of the present invention is directed to the use of a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material, for improving performance of an electrophoretic display.

The tenth aspect of the present invention is directed to an electrophoretic display comprising at least one electrode protecting layer formed of a composition comprising one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material.

The electrophoretic displays of the present invention show an increase in contrast ratio and image bistability even at low driving voltages without trade-off in display longevity and image uniformity.

DETAILED DESCRIPTION OF THE INVENTION

Definitions

Unless defined otherwise in this specification, all technical terms are used herein according to their conventional definitions as they are commonly used and understood by those of ordinary skill in the art.

The term "microcup" refers to the cup-like indentations which may be created by methods such as microembossing or a photolithographic process as described in the co-pending application, U.S. Ser. No. 09/518,488.

The term "well-defined", when describing the microcups or cells, is intended to indicate that the microcup or cell has a definite shape, size and aspect ratio which are pre-determined according to the specific parameters of the manufacturing process.

The term "aspect ratio" is a commonly known term in the art of electrophoretic displays. In this application, it refers to the depth to width or depth to length ratio of the microcups.

The term "Dmax" refers to the maximum achievable optical density of the display.

The term "Dmin" refers to the minimum optical density of the display background.

The term "contrast ratio" refers to the ratio of the reflectance (% of light reflected) of the Dmin state to the reflectance of the Dmax state.

The term "charge transport material" is defined as a material capable of transporting either electrons or holes from one side (such as the electrode side) of the protecting layer to the other side (such as the electrophoretic fluid side) or vise-versa. Electrons are injected from the cathode and holes are injected from the anode into the electron transporting and hole transporting layer, respectively. A general review of the charge transport materials may be found in references, such as P. M. Borsenberger and D. S. Weiss, "Photoreceptors: Organic Photoconductors" in "Handbook of Imaging Materials", A. S. Diamond ed., pp 379, (1991), Marcel Dekker, Inc.; H. Sher and E W Montroll, Phys. Rev., B12, 2455 (1975); S. A. Van Slyke et. al., Appl. Phys. Lett., 69, 2160, (1996); or F. Nuesch et. al., J. Appl. Phys., 87, 7973 (2000).

The term "electrode protecting layer" is defined in the section below.

General Description of the Microcup Technology

Figure 1A:
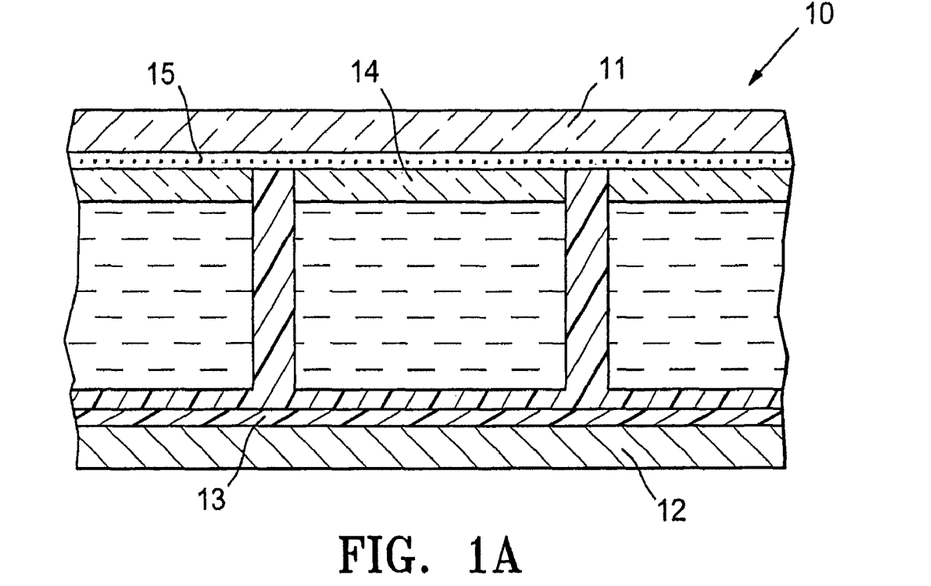
FIGS. 1A and 1B are schematic depiction of an electrophoretic display cell prepared by the microcup technology.
Figure 1B:
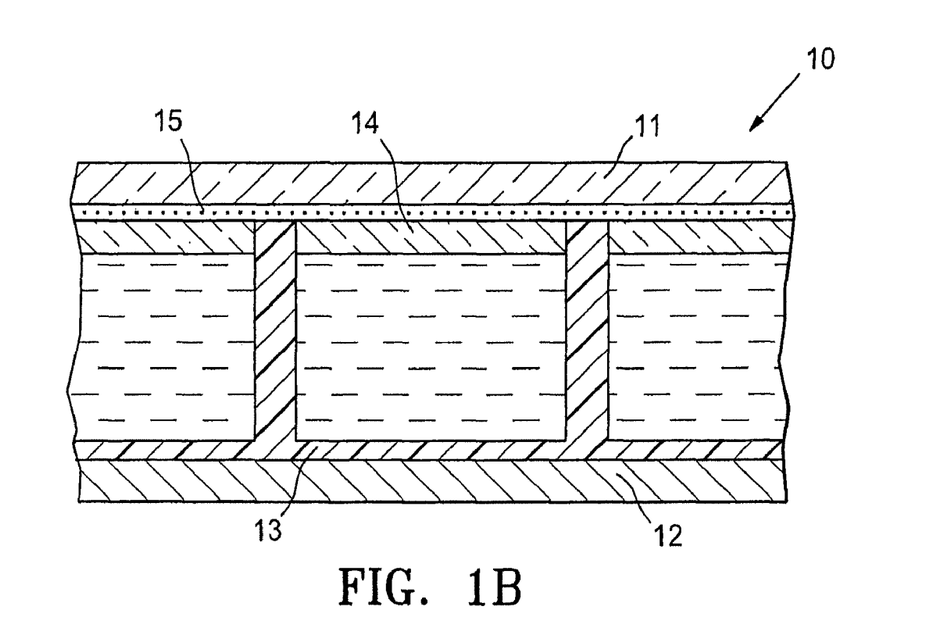

FIGS. 1A and 1B depict typical display cells prepared by the microcup technology as disclosed in WO01/67170. The microcup based display cell (10) is sandwiched between a first electrode layer (11) and a second electrode layer (12). A thin protective layer (13) is optionally present between the cell (10) and the second electrode layer (12) as seen in the figures. As shown in FIG. 1A, the layer (13) may be a primer layer (adhesion promoting layer) to improve the adhesion between the microcup material and the second electrode layer (12). Alternatively the layer (13) may be a thin layer of the microcup material (as shown in FIG. 1B) if the microcup array is prepared by an embossing process. The cell (10) is filled with an electrophoretic fluid and sealed with a sealing layer (14) on the open side of the microcups. The first electrode layer (11) is laminated onto the sealed cell, preferably with an adhesive (15).

In the context of the present invention, the term "electrode protecting layer" may be the primer layer or the thin microcup layer (13), sealing layer (14) or adhesive layer (15) as shown in FIGS. 1A and 1B.

In case of in-plane switching EPDs, one of the electrode layers (11 or 12) may be replaced by an insulating layer.

The display panel may be prepared by microembossing or photolithography as disclosed in WO01/67170. In the microembossing process, an embossable composition is coated onto the conductor side of the second electrode layer (12) and embossed under pressure to produce the microcup array. To improve the mold release property, the conductor layer may be pretreated with a thin primer layer (13) before coating the embossable composition.

The embossable composition may comprise a thermoplastic or thermoset material or a precursor thereof, such as multifunctional vinyls including, but are not limited to, acrylates, methacrylates, allyls, vinylbenzenes, vinylethers, multifunctional epoxides and oligomers or polymers thereof, and the like. Multifunctional acrylate and oligomers thereof are the most preferred. A combination of a multifunctional epoxide and a multifunctional acrylate is also very useful to achieve desirable physico-mechanical properties. A low Tg binder or crosslinkable oligomer imparting flexibility, such as urethane acrylate or polyester acrylate, is usually also added to improve the flexure resistance of the embossed microcups. The composition may contain an oligomer, a monomer, additives and optionally a polymer. The Tg (glass transition temperature) for the embossable composition usually ranges from about −70° C. to about 150° C., preferably from about −20° C. to about 50° C.

The microembossing process is typically carried out at a temperature higher than the Tg. A heated male mold or a heated housing against which the mold presses may be used to control the microembossing temperature and pressure.

The mold is released during or after the embossable composition is hardened to reveal an array of microcups (10). The hardening of the embossable composition may be accomplished by cooling, solvent evaporation, cross-linking by radiation, heat or moisture. If the curing of the embossable composition is accomplished by UV radiation, UV may radiate onto the embossable composition through the transparent conductor layer. Alternatively, UV lamps may be placed inside the mold. In this case, the mold must be transparent to allow the UV light to radiate through the pre-patterned male mold on to the embossable composition.

The composition of the primer layer is at least partially compatible with the embossing composition or the microcup material after curing. In practice, it may be the same as the embossing composition.

In general, the dimension of each individual microcup may be in the range of about $10^2$ to about $1 \times 10^6$ $\mu m^2$, preferably from about $10^3$ to about $1 \times 10^5$ $\mu m^2$. The depth of the microcups is in the range of about 3 to about 100 microns, preferably from about 10 to about 50 microns. The ratio between the area of opening to the total area is in the range of from about 0.05 to about 0.95, preferably from about 0.4 to about 0.9. The width of the openings usually are in the range of from about 15 to about 450 microns, preferably from about 25 to about 300 microns, from edge to edge of the openings.

The microcups are then filled with an electrophoretic fluid and sealed as disclosed in U.S. Pat. No. 6,930,818 (corresponding to WO 01/67170), U.S. Pat. No. 6,795,138 (corresponding to WO02/56097), U.S. Pat. No. 6,672,921 (corresponding to WO 02/01281) and U.S. Pat. No. 6,933,098 (corresponding to WO02/65215), all of which are incorporated herein by reference.

The sealing of the microcups may be accomplished in a number of ways. Preferably, it is accomplished by overcoating the filled microcups with a sealing composition comprising a solvent and a sealing layer forming material selected from the group consisting of thermoplastic elastomers, polyvalent acrylate or methacrylate, cyanoacrylates, polyvalent vinyl including vinylbenzene, vinylsilane, vinylether, polyvalent epoxide, polyvalent isocyanate, polyvalent allyl, oligomers or polymers containing crosslinkable functional groups and the like. Additives such as a polymeric binder or thickener, photoinitiator, catalyst, vulcanizer, filler, colorant or surfactant may be added to the sealing composition to improve the physico-mechanical properties and the optical properties of the display. The sealing composition is incompatible with the electrophoretic fluid and has a specific gravity no greater than that of the electrophoretic fluid. Upon solvent evaporation, the sealing composition forms a conforming seamless seal on top of the filled microcups. The sealing layer may be further hardened by heat, radiation or other curing methods. Sealing with a composition comprising a thermoplastic elastomer is particularly preferred. Examples of thermoplastic elastomers may include, but are not limited to, tri-block or di-block copolymers of styrene and isoprene, butadiene or ethylene/butylene, such as the Kraton™ D and G series from Kraton Polymer Company. Crystalline rubbers such as poly(ethylene-co-propylene-co-5-methylene-2-norbornene) and other EPDM (ethylene propylene diene rubber terpolymer) from Exxon Mobil have also been found very useful.

Alternatively, the sealing composition may be dispersed into an electrophoretic fluid and filled into the microcups. The sealing composition is incompatible with the electrophoretic fluid and is lighter than the electrophoretic fluid. Upon phase separation, the sealing composition floats to the top of the filled microcups and forms a seamless sealing layer thereon after solvent evaporation. The sealing layer may be further hardened by heat, radiation or other curing methods.

The sealed microcups finally are laminated with the first electrode layer (11) which may be pre-coated with an adhesive layer (15).

Preferred materials for the adhesive layer may be formed from one adhesive or a mixture thereof selected from the group consisting of pressure sensitive, hot melt and radiation curable adhesives. The adhesive layer forming materials may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. Adhesives comprising polymers or oligomers having a high acid or base content such as polymers or copolymers derived from acrylic acid, methacrylic acid, itaconic acid, maleic anhydride, vinylpyridine and derivatives thereof are particularly useful. The adhesive layer may be post cured by, for example, heat or radiation such as UV after lamination.

Embodiments of the Present Invention

The term "electrode protecting layer", as stated above, may be the primer layer (13), sealing layer (14) or adhesive layer (15) as shown in FIGS. 1A and 1B.

The primer layer (13) of the display, as stated above, may be formed from a composition comprising a primer layer forming material such as a thermoplastic or thermoset material or a precursor thereof. Examples of primer layer forming materials include, but are not limited to, multifunctional acrylates or methacrylates, vinylbenzenes, vinylethers, epoxides or oligomers and polymers thereof. A multifunctional acrylate and oligomers thereof are usually preferred. The thickness of the primer layer is in the range of about 0.1 to about 5 microns, preferably about 0.1 to about 1 microns.

The sealing layer (14) is formed from a composition comprising a solvent and a sealing layer forming material selected from the group consisting of thermoplastic elastomers, polyvalent acrylate or methacrylate, cyanoacrylates, polyvalent vinyl including vinylbenzene, vinylsilane, vinylether, polyvalent epoxide, polyvalent isocyanate, polyvalent allyl, oligomers or polymers containing crosslinkable functional groups, and the like. The thickness of the sealing layer is in the range of about 0.5 to about 15 microns, preferably about 1 to about 8 microns.

Materials suitable for the adhesive layer (15) may include, but are not limited to, acrylics, styrene-butadiene copolymers, styrene-butadiene-styrene block copolymers, styreneisoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. The thickness of the adhesive layer is in the range of about 0.2 to about 15 microns, preferably about 1 to about 8 microns.

The first aspect of the present invention is directed to a method for improving the performance of an electrophoretic display, which method comprises adding a high absorbance dye or pigment into at least one of the electrode protecting layers of the display. The dye or pigment may be dissolved or dispersed in the electrode protecting layer.

The dye or pigment may be present in more than one electrode protecting layers on the non-viewing side of the display. If the dye or pigment is used in the primer or the microcup layer, it should not interfere with the hardening or mold release in the microembossing process.

In addition to the improvement in switching performance, the use of a high absorbance dye or pigment in the layer(s) opposite from the viewing side of the display also provides a dark background color and an enhanced contrast ratio.

The dye or pigment preferably has an absorption band in the range of 320-800 nm, more preferably 400-700 nm. Suitable dyes or pigments for the present invention may include, but are not limited to, metal phthalocyanines or naphthalocyanines (wherein the metal may be Cu, Al, Ti, Fe, Zn, Co, Cd, Mg, Sn, Ni, In, Ti, V or Pb), metal porphines (wherein the metal may be Co, Ni or V), azo (such as diazo or polyazo) dyes, squaraine dyes, perylene dyes and croconine dyes. Other dyes or pigments which may generate or transport charge in their excited state or ground state would also be suitable. Examples of this type of dyes or pigments are those typically used as charge generating materials in organic photoconductors (See P. M. Borsenberger and D. S. Weiss, "Photoreceptors: Organic Photoconductors" in "Handbook of Imaging Materials", A. S. Diamond ed., pp 379, (1991), Marcel Dekker, Inc).

Particularly preferred dyes or pigments are:

Cu phthalocyanines and naphthalocyanines such as ORASOL™ Blue GN (Color Index C.I. Solvent Blue 67, Cu {29H,31H-phthalocyaninato(2-)-N29,N30,N31,N32}-{{3-(1-methyethoxy)propyl}amino}sulfonyl derivative from Ciba Specialty Chemicals (High Point, N.C.);

Ni phthalocyanine;

Ti phthalocyanine;

Ni tetraphenylporphine;

Co phthalocyanine,

Metal porphine complexes such as tetraphenylporphine vanadium(IV) oxide complex and alkylated or alkoxylated derivatives thereof;

ORASOL™ Black RLI (C.I. Solvent Black 29, 1:2 Chrome complex, from Ciba Specialty Chemicals);

Diazo or polyazo dyes including Sudan dyes such as Sudan Black B (Color Index C.I. 26150, Fat Black HB, Solvent Black 3), Sudan Blue (C.I. 61552, Atlasol Blue 2N, 1,4-bis(ethylamino)-9,10-anthraquinone), Sudan R, Sudan Red B (C.I. 26110); Sudan Red 7B (C.I. 26050, Fat Red 7B, Solvent Red 19), Sudan Yellow or Sudan I (C.I. 12055, 1-phenylazo-2-naphthol, Solvent Yellow 14), Sudan II (C.I. 12140, Solvent Orange 7), Sudan III (C.I. 26110, Solvent Red 23), or Sudan IV (C.I. 26105, Scarlet Red, Solvent Red 24);

Squaraine and croconine dyes such as 1-(4-dimethylamino-phenyl)-3-(4-dimethylimmonium-cyclohexa-2,5-dien-1-ylidene)-2-oxo-cyclobuten-4-olate, 1-(4-methyl-2-morpholino-selenazo-5-yl)-3-(2,5-dihydro-4-methyl-2[morpholin-1-ylidene-onium]-selenzaol-5-ylidene)-2-oxo-cyclobuten-4-olate or 1-(2-dimethylamino-4-phenyl-thiazol-5-yl)-3-(2,5-dihydro-2-dimethylimmonium-4-phenyl)-thiazol-5-ylidene)-2-oxo-cyclobuten-4-olate; and Condensed perylene dyes or pigments such as 2,9-di(2-hydroxyethyl)-anthra[2,1,9-def:6,5,10-d'e'f]diisoquinoline-1,3,8,10-tetrone, 9-di(2-methoxyethyl)-anthra[2,1,9-def:6,5,10-d'e'f]diisoquinoline-1,3,8,10-tetrone, bisimidazo[2,1-a:2',1']anthra[2,1,9-def:6,5,10-d'e'f]diisoquinoline-dione or anthra[2",1",9":4,5, 6:6",5",10":4',5',6']

Some of the dyes or pigments such as metal (particularly Cu and Ti) phthalocyanines and naphthalocyanines have also been found useful as charge transport materials.

The concentration of the dye or pigment may range from about 0.1% to about 30%, preferably from about 2% to about 20%, by weight of the total solid content of the layer. Other additives such as surfactants, dispersion aids, thickeners, crosslinking agents, vulcanizers, nucleation agents or fillers may also be added to enhance the coating quality and display performance.

The second aspect of the invention is directed to a method for improving performance of an electrophoretic display, which method comprises adding particles of a conductive material into at least one of the electrode protecting layers.

The conductive materials include, but not limited to, organic conducting compounds or polymers, carbon black, carbonaceous particles, graphite, metals, metal alloys or conductive metal oxides. Suitable metals include Au, Ag, Cu, Fe, Ni, In, Al and alloys thereof. Suitable metal oxides may include indium-tin-oxide (ITO), indium-zinc-oxide (IZO), antimony-tin oxide (ATO), barium titanate ($BaTiO_3$) and the like. Suitable organic conducting compounds or polymers may include, but are not limited to, polyp-phenylene vinylene), polyfluorene, poly(4,3-ethylenedioxythiophene), poly(1,2-bis-ethylthio-acetylene), poly(1,2-bis-benzylthio-acetylene), 5,6,5',6'-tetrahydro-[2,2]bi[1,3]dithiolo[4,5-b][1,4]dithiinylidene], 4,5,6,7,4',5',6',7'-octahydro-[2,2']bi[benzo[1,3]dithiolylidene, 4,4'-diphenyl-[2,2']bi[1,3]dithiolylidene, 2,2,2',2'-tetraphenyl-bi-thiapyran-4,4'-diylidene, hexakis-bezylthio-benzene and derivatives thereof.

Organic and inorganic particles overcoated with any of the above-mentioned conductive materials are also useful.

Addition of the conductive material, in the form of particles, into an electrode protecting layer improves the contrast ratio at low operating voltages. However, the amount of the conductive material added should be well controlled so that it does not cause short or current leakage. The amount of the conductive material added preferably is in the range of from about 0.1% to about 40%, more preferably from about 5% to about 30%, by weight of the total solid content of the layer.

Additives such as dispersion agents, surfactants, thickeners, crosslinking agents, vulcanizers or fillers may also be added to improve the coating quality and display performance. The conductive material may be added to more than one electrode protecting layer. The particle size of the conductive material is in the range of from about 0.01 to about 5 µm, preferably from about 0.05 to about 2 µm.

The third aspect of the invention is directed to a method for improving the performance of an electrophoretic display which method comprises adding a conductive filler in the form of nanoparticles and having a volume resistivity of less than about $10^4$ ohm cm, preferably about $10^2$ to about $10^3$ ohm cm, into a composition for the formation of at least one electrode protecting layer in the display.

The conductive filler is in the form of nanoparticles. The term "nanoparticles", in the context of the present invention, refers to particles having an average primary particle size which is smaller than the range of UV-visible scattering light (about 0.15 to about 0.3 um) or a typical short range surface roughness (about 0.05 to about 0.1 um) of a plastic film. More specifically, the average size of the primary conductive filler particles suitable for the present invention is in the range of about 5 to about 150 nanometer, preferably about 10 to about 50 nanometer and more preferably about 15 to about 20 nanometer.

The resulting electrode protecting layer may have a desired volume resistivity in the range of about $10^7$ to $10^{10}$ ohm cm. The primer layer, sealing layer or adhesive layer forming material in the composition may have a volume resistivity in the range of $10^{12}$ to $10^{14}$ ohm cm.

Suitable conductive fillers may include, but are not limited to, conductive metal oxide particles, carbon black, graphite, carbon nanotube, conductive polymers such as polythiophene (PT), polyacetylene, polypyrrole (PPy) or polyaniline (PAN), metal particles or flakes such as silver particles or flakes and conductive nanoclusters such as Au or Cu nanoclusters. Specific examples of suitable conductive fillers may include zinc antimonate, zinc sulfide, indium tin oxide, antimony tin oxide and the like.

The conductive filler in the form of nanoparticles may be dispersed in a sol gel (which is a colloidal dispersion of the nanoparticles). In this case, the sol gel may comprise a solvent compatible with the embossable composition. For example, the solvent may be 2-butanone, acetone, isopropanol or the like. The concentration of the conductive filler in the sol gel may be in the range of about 15% to about 45%, preferably in the range of about 30% to about 40%.

The conductive filler preferably is colorless and highly transparent. For example, it should have about 75% to about 95%, preferably about 85% to about 90%, transmission in the visible light range for a 20 μm dried film containing about 30% by weight of the conductive filler.

In one embodiment, the conductive filler is Celnax® (from Nissan Chemical) which is zinc antimonate colloidal nanoparticles.

The fourth aspect of the invention is directed to a method for improving the performance of an electrophoretic display, which method comprises adding a charge transport material to at least one of the electrode protecting layers of the display.

Charge transport materials are materials capable of transporting either electrons or holes from one side (such as the electrode side) of the electrode protecting layer to the other side (such as the electrophoretic fluid side) or vice-versa. Electrons are injected from the cathode and holes are injected from the anode into the electron transporting and hole transporting layers, respectively. A general review of the charge transport materials may be found in references, such as P. M. Bosenberger and D. S. Weiss, "Photoreceptors: Organic Photoconductors" in "Handbook of Imaging Materials", A. S. Diamond ed., pp 379, (1991), Marcel Dekker, Inc.; H. Sher and E W Montroll, Phys. Rev., B12, 2455 (1975); S. A. Van Slyke Appl. Phys. Lett., 69, 2160, (1996); or F. Nuesch et. al., J. Appl. Phys., 87, 7973 (2000).

Suitable electron and hole transport materials may be found from general technical reviews in organic photoconductors and organic light emitting diodes such as those listed above.

The hole transport materials are typically compounds having a low ionization potential which may be estimated from their solution oxidation potentials. In the context of the present invention, compounds having an oxidation potential less than 1.4 V, particularly less than 0.9 V (vs SCE) are found useful as the charge transport materials. Suitable charge transport materials should also have acceptable chemical and electrochemical stability, reversible redox behavior and sufficient solubility in the protection layer for the electrodes. Too low an oxidation potential may result in undesirable oxidation in air and a short display shelf life. Compounds having oxidation potentials between 0.5-0.9 V (vs SCE) are found particularly useful for this invention.

In the context of the present invention, particularly useful hole transport materials include compounds in the general classes of:

Pyrazolines such as 1-phenyl-3-(4'-dialkylaminostyryl)-5-(4"-dialkylaminophenyl)pyrazoline;

Hydrazones such as p-dialkylaminobenzaldehyde-N,N-diphenylhydrazone, 9-ethyl-carbazole-3-aldehyde-N-methyl-N-phenylhydrazone, pyrene-3-aldehyde-N,N-diphenylhydrazone, 4-diphenylamino-benzaldehyde-N,N-diphenylhydrazone, 4-N,N-bis(4-methylphenyl)-amino-benzaldehyde-N,N-diphenylhydrazone, 4-dibenzylamino-benzaldehyde-N,N-diphenylhydrazone or 4-dibenzylamino-2-methyl-benzaldehyde-N,N-diphenylhydrazone;

Oxazoles and oxadiazoles such as 2,5-bis-(4-dialkylaminophenyl)-4-(2-chlorophenyl)oxazole, 2,5-bis-(4-N,N'-dialkylaminophenyl)-1,3,4-oxadiazole, 2-(4-biphenylyl)-5-(4-tert-butylphenyl)-1,2,3-oxadiazole, 2,2'-(1,3-phenylene)bis[5-[4-(1,1-dimethylethyl)phenyl]1,3,4-oxadiazole, 2,5-bis(4-methylphenyl)-1,3,4-oxadiazole or 1,3-bis(4-(4-diphenylamino)-phenyl-1,3,4-oxadiazol-2-yl)benzene;

Enamines, carbazoles or arylamines, particularly triaryamines such as bis(p-ethoxyphenyl)acetaldehyde di-p-methoxyphenylamine enamine, N-alkylcarbazole, trans-1,2-biscarbazoyl-cyclobutane, 4,4'-bis(carbazol-9-yl)-biphenyl, N,N'-diphenyl-N,N'-bis(3-methylphenyl)-[1,1-bi[phenyl]-4,4'-diamine, 4,4'-bis(N-naphthyl-N-phenyl-amino)biphenyl (or N,N'-di(naphthalene-2-yl)-N,N'-diphenyl-benzidine); 4,4',4"-trismethyl-triphenylamine, N-biphenylyl-N-phenyl-N-(3-methylphenyl)amine, bisphenyl-ethen-1-yl)triphenylamine, N,N'-di-(4-methylphenyl)N,N'-diphenyl-1,4-phenylendiamine, 4-(2,2-bisphenyl-ethen-1-yl)-4',4"-dimethyl-triphenylamine, N,N,N'N'-tetraphenylbenzidine, N,N,N',N'-tetrakis(4-methyphenyl)-benzidine, N,N'-bis-(4-methylphenyl)-N,N'-bis-(phenyl)-benzidine, 4,4'-bis(dibenz-azepin-1-yl)biphenyl; 4,4'-bis(dihydro-dibenz-azepin-1-yl)-biphenyl, di-(4-dibenzylamino-phenyl)-ether, 1,1-bis-(4-bis(4-methyl-phenyl)-amino-phenyl)cyclohexane, 4,4'-bis(N,N-diphenylamino)-quaterphenyl, N,N,N',N'-tetrakis(naphtha-2-yl)benzidine, N,N'-bis(phenanthren-9-yl)-N,N'-bisphenyl-benzidine, N,N'-bis(phenanthren-9-yl)-N,N'-bisphenyl-benaidine, 4,4',4"-tris(carbazol-9-yl)-triphenylamine, 4,4',4"-tris(N,N-diphenylamino)-triphenylamine, 4,4'-bis(N-(1-naphthyl)-N-phenyl-amino)-quaterphenyl, 4,4',4"-tris(N-(1-naphthyl)-N-phenyl-amino)triphenylamine or N,N'-diphenyl-N,N'-bis(4'-(N,N-bis(naphthy-1-yl)-amino)-biphenyl-4-yl)-benzidine;

Triarylmethanes such as bis(4-N,N-dialkylamino-2-methylphenyl)-phenylmethane;

Biphenyls such as 4,4'-bis(2,2-diphenyl-ethen-1-yl)-biphenyl;

Dienes and dienones such as 1,1,4,4-tetraphenyl-butadiene, 4,4'-(1,2-ethanediylidene)-bis(2,6-dimethyl-2,5-cyclohexadien-1-one), 2-(1,1-dimethylethyl)-4-[3-(1,1-dimethylethyl)-5-methyl-4-ox-2,5-cyclohexa-dien-1-ylidene]-6- methyl-2,5-cyclohexadien-1-one, 2,6-bis(1,1-dimethylethyl)4-[3,5-bis(1,1-dimethylethyl)4-oxo-2,5-cyclohexa-dien-1-ylidene]-2,5-cyclohexadien-1-one or 4,4'-(1,2-ethanediylidene)-bis(2,6-(1,1-dimethyl-ethyl)2,5-cyclohexadien-1-one); and Triazoles such as 3,5-bis(4-tert-phenyl)-4-phenyl-triazole or 3-(4-biphenylyl)-4-phenyl-5-tert-butylphenyl-1,2,4-triazole.

Oligomeric or polymeric derivatives containing any of the above-mentioned functional groups are also useful as charge transport materials.

Particularly useful electron transport materials include electron deficient compounds in the general classes of:

Fluorenones such as 2,4,7-trinitro-9-fluorenone or 2-(1,1-dimethylbutyl)-4,5,7-trinitro-9-fluorenone; and Nitriles such as (4-butoxycarbonyl-9-fluorenylidene)malononitrile, 2,6-di-tert-butyl-4-dicyanomethylene-4-H-thiopyran-1,1-dioxide, 2-(4-(1-methyl-ethyl)-phenyl)-6-phenyl-4H-thiopyran-4-ylidene]-propanedinitril-1,1-dioxide or 2-phenyl-6-methylphenyl-4-dicyanomethylene-4-H-thiopyran-1,1-dioxide or 7,7,8,8-tetrachcyanonquinodimethane.

The oligomeric or polymeric derivatives containing any of the above-mentioned functional groups are also useful.

The hole and electron transfer materials may be co-present in the same layer or even in the same molecule or in different layers on opposite or the same side of the display cell. Dopants and host materials such as 4-(dicyanomethylene)-2-methyl-6-(julolidin-4-yl-vinyl)-4H-1-pyran, bis(2-2-hydroxyphenyl)-benz-1,3-thiazolato)-Zn complex, bis(2-(2-hydroxyphenyl)-benz-1,3-oxadiazoleato)-Zn complex, tris (8-hydroxy-chinolinato)-Al complex, tris(8-hydroxy-4-methyl-chinolinato)-Al complex or tris(5-chloro-8-hydroxy-chinolinato)-Al complex may also be added into the electrode protecting layer.

The charge transport material may be incorporated into the composition of one electrode protecting layer or may be present in more than one layers. A clear and colorless charge transport material is preferred if it is to be added into the electrode protecting layer on the viewing side of the display. The concentration of the charge transport material may range from about 0.1% to about 30%, preferably from about 2% to about 20%, by weight of the total solid content of the layer. Other additives such as surfactants, dispersion aids, thickeners, crosslinking agents, vulcanizers, nucleation agents or fillers may also be added to enhance the coating quality and display performance.

It should be noted that the above four aspects of the invention may be performed alone or in any combination. More than one aspect of the invention may also be co-present in the same electrode protecting layer. The materials used in the electrode protecting layer on the viewing side of the display are preferred to be colorless and transparent. Also, the materials used in the primer and microcup layers should not interfere with the hardening (such as UV curing) of the layers or mold release in the embossing process.

The fifth aspect of the present invention is directed to an adhesive composition comprising an adhesive layer forming material and one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material.

The sixth aspect of the present invention is directed to a sealing composition comprising a sealing layer forming material and one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material.

The seventh aspect of the present invention is directed to a primer layer composition comprising a primer layer forming material and one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material.

The sealing, adhesive and primer layer compositions are particularly useful for electrophoretic displays prepared from the microcup technology.

In the case of a conductive filler, the composition may be prepared by gradually adding the conductive filler in the form of nanoparticles and having a volume resistivity of less than about $10^4$ ohm cm, preferably about $10^2$ to about $10^3$ ohm cm, into a composition under strong stirring for a period of time until the composition is homogeneously blended. The length of the time depends on the stirring conditions. The conductive filler may be added in a dried form or in the form of a sol gel as described above. The concentration of the conductive filler (calculated on the basis of the dried form) in the composition for the adhesive, sealing or primer layer may range from about 0.01% to about 50%, preferably from about 15% to about 45%, by weight of the total solid content.

Additives such as dispersion agents, surfactants, thickeners, crosslinking agents or vulcanizers may also be added into any of the compositions discussed above to improve the coating quality and display performance.

Suitable adhesive layer forming materials, sealing layer forming materials, primer layer forming materials, thermoplastic or thermoset materials, high absorbance dyes or pigments, conductive particles, conductive fillers in the form of nanoparticles and having a volume resistivity of less than about $10^4$ ohm cm, preferably about $10^2$ to about $10^3$ ohm cm and charge transport materials used in the compositions have all been described in this application.

The eighth aspect of the present invention is directed to a method for improving the performance of an electrophoretic display by incorporating non-light-absorbing conducting particles into a composition for the formation of an electrode protecting layer.

The ninth aspect of the present invention is directed to the use of one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material for improving performance of an electrophoretic display.

The tenth aspect of the present invention is directed to an electrophoretic display comprising at least one electrode protecting layer formed of a composition comprising one or more of the following: a high absorbance dye or pigment, or conductive particles, or a conductive filler in the form of nanoparticles and having a volume resistivity of less than about $10^4$ ohm cm, preferably about $10^2$ to about $10^3$ ohm cm, or a charge transport material.

While the microcup technology as disclosed in WO01/67170 is discussed in this application, it is understood that the methods, compositions and uses of the present invention are applicable to all types of electrophoretic displays, including but not limited to, the microcup-based displays (WO01/67170), the partition type displays (see M. A. Hopper and V. Novotny, *IEEE Trans. Electr. Dev.*, 26(8):1148-1152 (1979)), the microcapsule type displays (U.S. Pat. Nos. 5,961,804 and 5,930,026) and the microchannel type displays (U.S. Pat. No. 3,612,758).

EXAMPLES

The following examples are given to enable those skilled in the art to more clearly understand and to practice the present invention. They should not be considered as limiting the scope of the invention, but merely as being illustrative and representative thereof.

Comparative Example 1

Example 1A

Preparation of Primer Coated Transparent Conductor Film

A primer coating solution containing 33.2 gm of EB 600™ (acrylated epoxy oligomer, UCB, Smyrna, Ga.), 16.12 gm of SR 399™ (pentafunctional monomer, Sartomer, Exton, Pa.), 16.12 gm of TMPTA (trimethylolpropane triacrylate, UCB, Smyrna, Ga.), 20.61 gm of HDDA (1,6-hexanediol diacrylate, UCB, Smyrna, Ga.), 2 gm of Irgacure™ 369 ([2-benzyl-2-(dimethylamino)-1-[4-(4-morpholinyl)phenyl]-1-butanone], Ciba, Tarrytown, N.Y.), 0.1 gm of Irganox™ 1035 (thiodiethylene bis(3,5-di(tert)-butyl-4-hydroxyhydrocinnamate), Ciba), 44.35 gm of poly(ethyl methacrylate) (MW. 515,000, Aldrich, Milwaukee, Wis.) and 399.15 gm of MEK (methyl ethyl ketone) was mixed thoroughly and coated onto a 3 mil transparent conductor film (ITO/PET film, 5 mil OC50 from CPFilms, Martinsville, Va.) using a #4 wire bar. The coated ITO film was dried in an oven at 65° C. for 10 minutes, then exposed to 1.8 J/cm² of UV light under nitrogen using a UV conveyer (DDU, Los Angles, Calif.).

Example 1B

Preparation of Microcups 33.15 Gm of EB 600™ (UCB, Smyrna, Ga.), 32.24 gm of SR399™ (Sartomer, Exton, Pa.), 6.00 gm of EB1360™ (silicone acrylate, UCB, Smyrna, Ga.), 8 gm of Hycar 1300×43 (reactive liquid polymer, Noveon Inc. Cleveland, Ohio), 0.2 gm of Irgacure™ 369 (Ciba, Tarrytown, N.Y.), 0.04 gram of ITX (Isopropyl-9H-thioxanthen-9-one, Aldrich, Milwaukee, Wis.), 0.1 gm of Irganox™ 1035 (Ciba, Tarrytown, N.Y.) and 20.61 gram of HDDA (1,6-hexanediol diacrylate, UCB, Smyrna, Ga.) were mixed thoroughly with a Stir-Pak mixer (Cole Parmer, Vernon, Ill.) at room temperature for about 1 hour, and degassed by centrifuge at 2000 rpm for about 15 minutes.

The microcup composition was slowly coated onto a 4"×4" electroformed Ni male mold for an array of 72 μm (length)× 72 μm (width)×35 μm (depth)×13 μm (width of top surface of spacing between cups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Example 1A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm² was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm².

Example 1C

Preparation of Electrophoretic Fluid 5.9 Gm of TiO₂ R900™ (DuPont) was added to a solution containing of 3.77 gm of MEK, 4.54 gm of N3400™ aliphatic polyisocyanate (Bayer AG) and 0.77 gm of 1-[N,N-bis(2-hydroxyethyl)amino]-2-propanol (Aldrich). The resultant slurry was homogenized for 1 minute at 5-10° C., after which 0.01 gm of dibutyltin dilaurate (Aldrich) was added and the mixture was homogenized for an additional minute. Finally a solution containing 20 gm of HT-200™ (Ausimont, Thorofare, N.J.) and 0.47 gm of R$_f$-amine-4900 [a precondensate of Krytox methyl ester (from Du Pont) and tris(2-aminoethyl) amine (Aldrich) prepared as shown below] was added and the mixture was homogenized again for 3 more minutes at room temperature.

The R$_f$-amine-4900 was prepared according to the following reaction:

The slurry prepared above was added slowly over 5 minutes at room temperature under homogenization into a mixture containing 31 gm of HT-200 and 2.28 gm of R$_f$-amine-4900. The resultant TiO₂ microcapsule dispersion was stirred under low shear with a mechanical stirrer at 35° C. for 30 minutes, then heated to 85° C. to remove MEK and post cure the internal phase for three hours. The dispersion showed a narrow particle size distribution ranging from 0.5-3.5 microns. The slurry was diluted with equal amount of PFS-2™ (Ausimont, Thorofare, N.J.) and the microcapsules were separated by centrifuge fractionation to remove the solvent phase. The solid collected was washed thoroughly with PFS-2™ and redispersed in HT-200.

Example 1D

Filling and Sealing with a Sealing Composition

1 Gm of an electrophoretic composition containing 6 parts (based on dry weight) of the TiO₂ microparticles prepared above and 94 parts of a HT-200 (Ausimont) solution of 1.5 wt % of a perfluorinated Cu-phthalocyanine dye (FC-3275, 3M, St. Paul, Minn.) was metered into the 4"×4" microcup array prepared from Example 1B, The excess of fluid was scraped away by a rubber blade. The filled microcups were then overcoated with a 10% rubber solution consisting of 9 parts of Kraton G1650 (Shell, Tex.), 1 part of GRP 6919 (Shell), 3 parts of Carb-O-Sil TS-720 (Cabot Corp., IL), 78.3 parts of Isopar E and 8.7 parts of isopropyl acetate by a Universal Blade Applicator and dried at room temperature to form a seamless sealing layer of about 2-3 μm dry thickness with good uniformity.

Example 1E

Lamination

The ITO side of an ITO/PET conductor film (5 mil OC50 from CPFilms) was overcoated with a 25 wt % solution of a pressure sensitive adhesive (Durotak 1105, National Starch, Bridgewater, N.J.) in methyl ethyl ketone (MEK) by a Myrad bar (targeted coverage: 0.6 gm/ft$^2$). The adhesive coated ITO/PET layer was then laminated over the sealed microcups prepared from Example 1D with a GBC Eagle 35 laminator at 70° C. The lamination speed was set at 1 ft/min with a gap of 1/32". The thus prepared EPD panel showed a contrast ratio of 1.5 at +20 V against a black background.

Example 2

The procedure of Example 1 was repeated, except that the sealing layer (Example 1D) and the adhesive layer (Example 1E) were replaced by those of Examples 2A and 2B respectively.

Example 2A

Sealing Layer Composition Containing Carbon Black 27.8 Gm of carbon black (Vulcan™ XC72, Cabot Corp.) was dispersed thoroughly into 320 gm of an isopropyl acetate/Isopar E (1/9) solution containing 0.75 wt % of Disperse-Ayd 6 (Elementis Specialties) using a high-speed disperser (Powergen, model 700 equipped with a 20 mm-saw-tooth shaft). A 10% (by weight) rubber solution (80 gm) containing 9 parts of Kraton™ G1650, 9 parts of Kraton™ RPG6919 (from Shell Chemical), 1 part of Isopropyl acetate and 81 parts of Isopar-E was added into the carbon black dispersion and mixed for another 30 minutes. The resultant carbon black dispersion was mixed with an additional 1780 gm of the same 10% rubber (Kraton™ G1650/Kraton™ RPG6919-9/1) solution, homogenized using a Silverson L4RT-A homogenizer for 2 hours and filtered through a 40 μm filter.

Example 2B

Adhesive Layer Composition Containing a Dye

A solution containing of 6.0 gm of a 25 wt % solution of ORASOL™ BlueGL (C.I. Solvent Blue 70, Chemical Class: Cu-phthalocyanine, Ciba Specialty Chemicals, High Point, N.C.) in MEK, 20.0 gm of Duro-Tak™ 80-1105 adhesive (50% solid from National Starch, Bridgewater, N.J.) and 51.0 gm of MEK was coated onto the ITO side of an ITO/PET film and laminated onto the sealed microcup array containing the electrophoretic fluid as prepared in Example 1. The target coverage of the adhesive remains the same: 0.6 gm/ft$^2$.

The EPD panel showed a contrast ratio of 6.2 at +20V.

Examples 3 to 7

The procedure of Example 2 was followed in Examples 3 to 7, except that the ORASOL™ Blue GL was replaced with the different dyes in the adhesive layer as shown in Table 1.

TABLE 1

Effect of Dyes and Carbon Black in Adhesive and Sealing Layers

| | Additive in Adhesive Layer | Additive in Sealing Layer | Contrast Ratio at ±20 V | Contrast Ratio at ±30 V |
|---|---|---|---|---|
| Comparative Example 1 | None | None | 1.5 | 2.2 |
| Example 2 | 13 wt % ORASOL ™ Blue GL (C.I. Solvent Blue 70, Cu-phthalocyanine) | 13 wt % Carbon Black | 6.2 | 9.3 |
| Example 3 | 13 wt % ORASOL ™ Red BL (C.I. Solvent Red 122; 1:2 chrome complex) | 13 wt % Carbon Black | 6.0 | 8.5 |
| Example 4 | 13 wt % ORASOL ™ Yellow 2GLN (C.I. Solvent Yellow 88; 1:2 chrome complex) | 13 wt % Carbon Black | 5.5 | 8.2 |
| Example 5 | 13 wt % ORASOL ™ Black CN (C.I. Solvent Black 28; 1:2 chrome complex) | 13 wt % Carbon Black | 5.2 | 8.1 |
| Example 6 | 13 wt % ORASOL ™ Black RLI (C.I. Solvent Black 29; 1:2 chrome complex) | 13 wt % Carbon Black | 5.0 | 7.2 |
| Example 7 | 13 wt % Sudan Black (C.I. 26150, Fat Black HB, Solvent Black 3) | 13 wt % Carbon Black | 5.0 | 6.7 |

All the ORASOL™ dyes in Table 1 were obtained from Ciba Specialty Chemicals, and the Sudan Black was obtained from Aldrich.

Example 8

The procedure of Example 2 was followed, except that the Orasol™ BlueGL in the adhesive layer was replaced with barium titanate (BaTiO$_3$). Thus, 12 gm of barium titanate (K-Plus-16, from Cabot, Mass.) was dispersed using a sonicator (Fisher dismembrator, Model 550) into the adhesive solution containing 15.5 g of Duro-Tak™ 80-1105, 18.8 gm of ethyl acetate, 15.9 gm of toluene, 1.4 gm of hexane and 1.1 gm of a polymeric dispersant (Disperbyk 163, BYK Chemie). The adhesive was coated onto the ITO side of an ITO/PET film (targeted dry coverage: 6 mm) and the resultant film was laminated onto the sealed microcup array as in Example 2 at 100° C.

The EPD panel showed a contrast ratio of 6.1 at ±30V.

Comparative Example 9

The procedure of Example 8 was followed, except that no BaTiO$_3$ was used in the adhesive layer (target dry coverage: 6 µm).

The EPD panel showed a contrast ratio of 4.7 at +30V.

Example 10

The procedure of Example 2 was followed, except that the Orasol™ BlueGL in the adhesive layer was replaced with N,N'-(bis(3-methylphenyl)-N-N'-diphenylbenzidine (BMD). Thus, 0.42 gm of BMD was dissolved at 80° C. into 28 gm of a 10 wt % solution of adhesive Duro-Tak™ 80-1105 in dimethyl formamide (DMF). The resultant adhesive solution was coated on the ITO side of a 5-mil ITO/PET using wire bars #12 and the resultant film was laminated onto the sealed microcup array as in Example 2 at 100° C.

The EPD panel showed a contrast ratio of about 3 at +20V.

Comparative Example 11

The procedure of Example 10 was followed, except that no BMD was used in the adhesive layer. The EPD panel thus prepared showed a contrast ratio of about 2 at ±20V.

Example 12

The same procedure of Example 1 was followed except that CELNAX® equivalent to 45% by weight of zinc antimonite was added to the primer layer.

Example 12 showed improvement in image bistability with the addition of CELNAX® in the primer layer.

While the present invention has been described with reference to the specific embodiments thereof, it should be understood that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:
1. A method for improving performance of an electrophoretic display, wherein said electrophoretic display comprises

(i) display cells filled with an electrophoretic fluid comprising charged pigment particles dispersed in a solvent or solvent mixture wherein said display cells are sandwiched between a first electrode layer and a second electrode layer,
(ii) a sealing layer on the open side of each of said display cells,
(iii) a primer layer between the display cells and the second electrode layer, and
(iv) an adhesive layer between the sealed display cells and the first electrode layer;
which method comprises adding a first conductive material into the sealing layer, and
adding a dye or pigment, a second conductive material, or a charge transport material into the primer layer or into the adhesive layer.

2. The method of claim 1, where the first or second conductive materials are independently selected from a group consisting of organic conducting compounds or polymers, carbon black, carbonaceous particles, graphite, metals, metal alloys and conductive metal oxides.

3. The method of claim 2, wherein said metal is selected from the group consisting of Au, Ag, Cu, Fe, Ni, In, Al and alloys thereof.

4. The method of claim 2, wherein said metal oxide is selected from the group consisting of indium-tin-oxide (ITO), indium-zinc-oxide (IZO), antimony-tin oxide (ATO) and barium titanate (BaTiO$_3$).

5. The method of claim 2, wherein said organic conducting compound or polymer is selected from the group consisting of poly(p-phenylene vinylene), polyfluorene, poly(4,3-ethylenedioxythiophene), poly(1,2-bis-ethylthio-acetylene), poly (1,2-bis benzylthio-acetylene), 5,6,5',6'-tetrahydro-[2,2']bi [1,3]dithiolo[4,5-b][1,4]dithiinylidene], 4,5,6,7,4',5',6',7'-octahydro-[2,2']bi[benzo[1,3]dithiolylidene, 4,4'-diphenyl-[2,2']bi[1,3]dithioylidene, 2,2,2',2'-tetraphenyl-bi-thiapyran-4,4'-diylidene, and hexakis-bezylthio-benzene.

6. The method of claim 1, wherein said first or second conductive material is organic or inorganic particles overcoated with a conductive material.

7. The method of claim 1, wherein the first conductive material is in the range of from about 0.1% to about 40% by weight of the total solid content of the sealing layer.

8. The method of claim 1, herein said dye or pigment has an absorption band in the range of 320-800 nm.

9. The method of 1, wherein said dye or pigment is selected from the group consisting of metal phthalocyanines, metal naphthalocyanines, metal porphines, azo dyes, squaraine dyes, perylene dyes and croconine dyes.

10. The method of claim 9, wherein said metal in said metal phthalocyanines or metal naphthalocyanies is Cu, Al, Ti, Fe, Zn, Co, Mg, Sn, In, Ti, V or Pb.

11. The method of claim 9, wherein said metal in porphines is Co, Ni or V.

12. The method of claim 1, wherein the dye or pigment is in the range of from about 0.1% to about 30% by weight of the total solid content of the primer layer or the adhesive layer.

13. The method of claim 1, wherein charge transport material is a compound having an oxidation potential less than 1.4 V.

14. The method of claim 1, wherein said charge transport material is a compound having an oxidation potential between 0.5-0.9 V.

15. The method of claim 1, wherein said charge transport material is selected from the group consisting of pyrazolines, hydrazones, oxazoles, oxadiazoles, enamines, carbazoles, arylamines, triarylmethanes, biphenyls, dienes, dienones and triazoles.

16. The method of claim 1, wherein said charge transport material is selected from the group consisting of fluorenones and nitriles.

17. The method of claim 1, wherein said charge transport material is in the range of from about 0.1% to about 30% by weight of the total solid content of the primer layer or the adhesive layer.

* * * * *